United States Patent
Kim (10) Patent No.: US 9,595,843 B2
(45) Date of Patent: Mar. 14, 2017

(54) BATTERY CHARGING APPARATUS AND BATTERY CHARGING METHOD THEREOF

(71) Applicant: LSIS CO., LTD., Anyang-si, Gyeonggi-do (KR)

(72) Inventor: Jeong Geun Kim, Seoul (KR)

(73) Assignee: LSIS CO., LTD, Seoul (KR)

( * ) Notice: Subject to any disclaimer, the term of this patent is extended or adjusted under 35 U.S.C. 154(b) by 570 days.

(21) Appl. No.: 13/910,915

(22) Filed: Jun. 5, 2013

(65) Prior Publication Data

US 2014/0021922 A1 Jan. 23, 2014

(30) Foreign Application Priority Data

Jul. 23, 2012 (KR) ........................ 10-2012-0079904

(51) Int. Cl.
*H02J 7/00* (2006.01)
*B60L 11/18* (2006.01)
(Continued)

(52) U.S. Cl.
CPC ............ *H02J 7/007* (2013.01); *B60L 3/0092* (2013.01); *B60L 11/1812* (2013.01); *H02J 7/0003* (2013.01); *H02J 7/0052* (2013.01); *H02J 7/022* (2013.01); *B60L 11/1818* (2013.01); *B60L 2230/10* (2013.01); *Y02T 10/7005* (2013.01); *Y02T 10/7088* (2013.01); *Y02T 90/127* (2013.01); *Y02T 90/14* (2013.01)

(58) Field of Classification Search
CPC .................................................. B60L 11/1816
USPC .................................................. 320/109, 137
See application file for complete search history.

(56) References Cited

U.S. PATENT DOCUMENTS

2004/0051498 A1 3/2004 Kim
2010/0106631 A1* 4/2010 Kurayama .......... B60L 11/1816
705/34
(Continued)

FOREIGN PATENT DOCUMENTS

CN 101627518 1/2010
JP 5-276673 10/1993
(Continued)

OTHER PUBLICATIONS

The State Intellectual Property Office of the People's Republic of China Application Serial No. 201310295888.1, Office Action dated Feb. 11, 2015, 9 pages.
(Continued)

*Primary Examiner* — Drew A Dunn
*Assistant Examiner* — Zixuan Zhou
(74) *Attorney, Agent, or Firm* — Lee Hong Degerman Kang & Waimey (57) ABSTRACT

Disclosed is a battery charging apparatus. The battery charging apparatus includes a charging plug receiving an AC power supplied from an outside, a plurality of charging units individually converting the AC power received through the charging plug into a DC power, a battery storing the DC power output through at least one of the charging units, and a charging control unit comparing a specification of the battery with specifications of the charging units, determining at least one of the charging units to be used for charging of the battery, and controlling the charging of the battery by the at least one charging unit that is determined.

9 Claims, 5 Drawing Sheets

(51) Int. Cl.
*B60L 3/00* (2006.01)
*H02J 7/02* (2016.01)

(56) References Cited

U.S. PATENT DOCUMENTS

| | | | | |
|---|---|---|---|---|
| 2011/0175569 A1* | 7/2011 | Austin | ............... | B60L 11/1824 320/109 |
| 2011/0181240 A1* | 7/2011 | Baarman | ............... | B60L 11/182 320/108 |
| 2011/0210698 A1* | 9/2011 | Sakai | ..................... | H02J 7/041 320/109 |

FOREIGN PATENT DOCUMENTS

| | | |
|---|---|---|
| JP | 2000-299136 | 10/2000 |
| JP | 2011-239559 | 11/2011 |
| KR | 10-2011-0137675 | 12/2011 |
| WO | 2012/086825 | 6/2012 |

OTHER PUBLICATIONS

Japan Patent Office Application Serial No. 2013-134804, Office Action dated Apr. 28, 2014, 4 pages.
Korean Intellectual Property Office Application Serial No. 10-2012-0079904, Office Action dated Jun. 4, 2013, 5 pages.

* cited by examiner

BATTERY CHARGING APPARATUS AND BATTERY CHARGING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0079904, filed on Jul. 23, 2012, the contents of which is incorporated by reference herein in its entirety.

BACKGROUND

The embodiment relates to a battery charging apparatus. In particular, the embodiment relates to a battery charging apparatus capable of representing the maximum power efficiency and a battery charging method using the same.

Eco-friendly vehicles refer to vehicles using batteries and electric motors instead of oil fuel and engines. Although the electric vehicles have been first manufactured in 1873, the electric vehicles have not been put to the practical use due to the technical limitations such as the heavy weight and the charging time of the battery.

The eco-friendly vehicle has employed a secondary cell (battery) that is chargeable as an energy source. In general, the electric vehicle or the fuel cell vehicle actuates a motor by using battery power in driving, and charges the battery in stopping.

In this case, in order to charge the battery, a charger is provided in a vehicle. Recently, in order to reduce the charging time of the battery, the maximum output power of the charger has been increased FIG. 1 is a block diagram showing an electric vehicle according to the related art.

Figure 1:
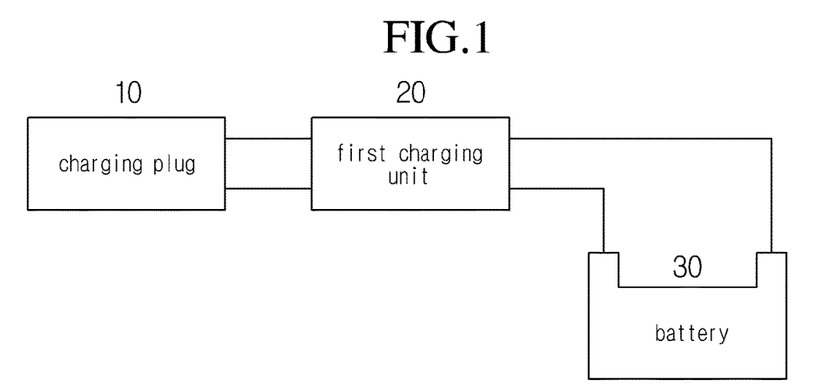
FIG. 1 is a block diagram showing an electric vehicle according to the related art.

Referring to FIG. 1, the electric vehicle includes a charging plug 10, a charging unit 20, and a battery 30.

Regarding the charging operation of the electric vehicle having the above operation, if the charging plug 10 is inserted into an AC power supply (for example, a stand provided in a charging station, or a power socket provided in a home or a building), the charging plug 10 receives AC power supplied from the AC power supply.

The charging unit 20 serves as a power conversion device provided in the electric vehicle, and converts the AC power into DC power if the AC power is received through the AC charging plug 10.

The battery 30 includes at least one battery cell to store the DC power supplied through the charging unit 20.

The electric vehicle having the above structure supplies the DC power to the battery 30 by converting the input AC power into the DC power when charging the battery 30.

In this case, recently, in order to reduce the charging time of the battery, the maximum output power of the charging unit has been increased. Therefore, the charging power according to the maximum output power is supplied to the battery, so that the charging time can be reduced.

However, there is a limitation when increasing the maximum output power of the charging unit, and a lot of time is spent in charging the battery by exclusively actuating only one charging unit.

In addition, the charging unit represents efficiencies varying depending on charging powers (voltages or currents) to be supplied to the battery 30. In this case, if the charging power to be supplied to the battery 30 is set to power representing a lower efficiency, power loss may be caused in a load region, so that a great amount of heat may be emitted and the delay may be caused in the charging of the battery.

SUMMARY

The embodiment provides an electric vehicle capable of charging the battery thereof by actuating a plurality of charging units in parallel, and a battery charging method thereof.

In addition, the embodiment provides an electric vehicle capable of supplying charging power to a battery based on power allowing a plurality of charging units to represent the maximum efficiency, and a battery charging method thereof.

However, objects of the suggested embodiments are not limited to the above objects, but those skilled in the art can apparently comprehend other objects from the following description.

According to the embodiment, there is provided the battery charging apparatus including a charging plug receiving an AC power supplied from an outside, a plurality of charging units individually converting the AC power received through the charging plug into a DC power, a battery storing the DC power output through at least one of the charging units, and a charging control unit comparing a specification of the battery with specifications of the charging units, determining at least one of the charging units to be used for charging of the battery, and controlling the charging of the battery by the at least one charging unit that is determined.

As described above, according to the embodiment, a plurality of charging units are actuated in parallel, so that the battery of the electric vehicle is charged, thereby reducing the charging time of the battery.

In addition, according to the embodiment, the output powers of the charging units are set based on the charging power while allowing the maximum efficiency of the charging units, thereby optimizing the efficiency, the price, and the volume of the charging units. In addition, the power loss can be minimized to prevent the heat emission and the delay in the charging of the battery.

DETAILED DESCRIPTION OF THE EMBODIMENTS

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

In the following description, charging power refers to power having a specific size to be supplied to a battery based on the specification of the battery. The maximum output power refers to the maximum size of power that can be output from the charging unit based on the specification of the charging unit. The maximum efficiency power refers to the power having a specific size, which can represent the maximum efficiency in the charging unit, according to the specification of the charging unit.

Figure 2:
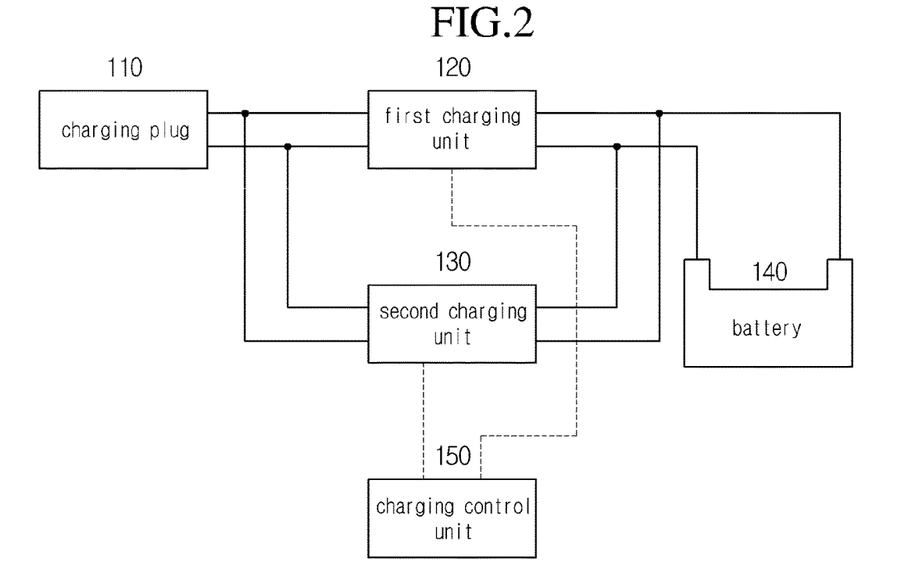
FIG. 2 is a block diagram showing a battery charging apparatus according to the embodiment.

FIG. 2 is a block diagram showing a battery charging apparatus according to the embodiment.

Referring to FIG. 2, the battery charging apparatus includes a charging plug 110, a first charging unit 120, a second charging unit 130, a battery 140, and a charging control unit 150.

The charging plug 110 is inserted into an AC power supply (for example, a system power supply provided in a charging station, or a power socket provided in a home or a building) to receive AC power supplied from the AC power supply.

In this case, the charging plug 110 may include a plurality of lines to receive the AC power.

In other words 110, the charging plug 110 may include a first power supply line to supply positive (+) power, a second power supply line to supply negative (+) power, and a communication line for the communication of a pilot signal.

In addition, the charging plug 110 may further include a ground line connected to the ground.

The first and second charging units 120 and 130 convert the AC power, which is received through the charging plug 110, into DC power.

In other words, the first and second charging units 120 and 130 output the DC power to charge the battery 140 by using the received AC power.

In this case, although two charging units are provided in drawings for the illustrative purpose, the number of charging units may be increased to N greater than 2.

The first and second charging units 120 and 130 convert the input AC power into DC power based on charging power determined by the charging control unit 150 to be described, and supply the DC power to the battery 140.

In this case, the first and second charging units 120 and 130 have the maximum output powers according to the specifications thereof, respectively, and supply the output power, which is set by the charging control unit 150 within the range of the maximum output power, to the battery 140.

The maximum output powers refer to the maximum size of power, which can be output from the first charging unit 120, and the maximum size of power which can be output from the second charging unit 130.

The first and second charging units 120 and 130 have power lines having the same characteristic and connected to each other to supply power to the battery through one common line.

Hereinafter, the details of the internal structures of the first and second charging units 120 and 130 will be described later.

The battery 140 may include at least one battery cell.

The operation of the at least one battery cell is controlled by the charging control unit 150 to be described later. The at least one battery cell may be realized by using various battery cells. For example, the at least battery cell may include a nickel-cadmium battery, a lead storage battery, a nickel metal hydride battery (NiMH), a lithium ion battery, a lithium polymer battery, a metallic lithium battery, or a zinc-air battery.

The charging control unit 150 controls the overall operation of the battery charging apparatus.

For example, the charging control unit 150 determines at least one charging unit to supply power to the battery 140 if the charging plug 110 is connected to the AC power supply for the charging of the battery 140. In other words, the charging control unit 150 determines a charging unit to be used for the charging of the battery 140.

In other words, the charging control unit 150 determines at least one of the first and second charging units 120 and 130 (preferably, among first to Nth charging units) to be used for the supplying of power to the battery 140, so that power is supplied to the battery 140 through the determined charging unit.

In this case, the charging control unit 150 determines a charging unit to be used for the charging of the battery 140 based on the specification of the battery 140 (for example, charging capacity) and the specifications of the first and second charging units 120 and 130.

In addition, the charging control unit 150 sets output power to be supplied to the battery 140 by the determined charging unit. In other words, the charging control unit 150 determines the charging unit while determining the size of DC power to be supplied from the determined charging unit to the battery 140.

In this case, the charging control unit 150 determines a charging unit to be used for the charging of the battery 140 and the size of output power to be supplied from the charging unit to the battery 140 by using charging power based on the specification of the battery 140, and the maximum efficiency power (output power for the maximum efficiency) and the maximum output power (the maximum power to be output) of each charging unit.

Meanwhile, generally, the higher power efficiency is represented when power is supplied to the battery 140 by using one charging unit rather than a plurality of charging units.

According, the charging control unit 150 determines the presence of a charging unit having the maximum output power higher than charging power based on the specification of the battery 140.

In addition, if the charging unit having the maximum output power, which is higher than the charging power, exists, the charging control unit 150 exclusively actuates only the charging unit to generate the output power used for the charging of the battery 140.

In this case, the charging control unit 150 sets the size of the output power of the charging unit, which is exclusively actuated, to the size equal to that of the charging power based on the specification of the battery.

Meanwhile, if the charging unit having the maximum output power, which is higher than the charging power, does not exist, the charging control unit 150 supplies power to the battery 140 through the combination of a plurality of charging units.

In this case, the charging control unit 150 sets output powers to be generated from a plurality of charging units with respect to the charging units. In other words, the sum of output powers set for the charging units is equal to the charging power based on the specification of the battery 140. Accordingly, the charging control unit 150 identifies the combination of output powers representing the highest efficiency (the maximum efficiency) among the combinations of output powers equal to the charging power.

For example, when the charging power based on the specification of the battery 140 is 50 kw, the maximum output power of the first charging unit is 30 kw, and the maximum output power of the second charging unit is 30 kw, the combinations of the output powers corresponding to the charging power are represented as the following number of cases.

(1) The output power of the first charging unit: 10 kw, the output power of the second charging unit: 40 kw (2) The output power of the first charging unit: 20 kw, the output power of the second charging unit: 30 kw (3) The output power of the first charging unit: 30 kw, the output power of the second charging unit: 20 kw.

(4) The output power of the first charging unit: 40 kw, the output power of the second charging unit: 10 kw.

In this case, since the first and second charging units have the same specifications (the same kinds of charging units), the cases (1) and (3) have the same combination, and the cases (2) and (4) have the same combination.

Accordingly, the charging control unit 150 checks average power efficiency when the output powers of the charging units are set through the combinations in the cases (1) and (2). Accordingly, the combination in the case representing the higher average power efficiency is set as the combination of the output powers of the charging units.

For example, if the average power efficiency in the case (1) is 90%, and if the average power efficiency in the case (2) is 92%, the charging control unit 150 sets the output power of the first charging unit to 20 kw, and sets the output power of the second charging unit to 30 kw corresponding to the case (2).

Meanwhile, although the charging units have various specifications (the maximum output power and the maximum efficiency power) for the illustrative purpose, the charging units may have various specifications.

In addition, the charging control unit 150 has a memory embedded therein. Accordingly, if the charging power is higher than the maximum output power of each charging unit, the charging control unit 150 may store the combination information of the output powers of the charging units, which can represent the maximum efficiency, among all cases related to the charging power, thereby setting output powers for the charging units by using the combination information.

Figure 3:
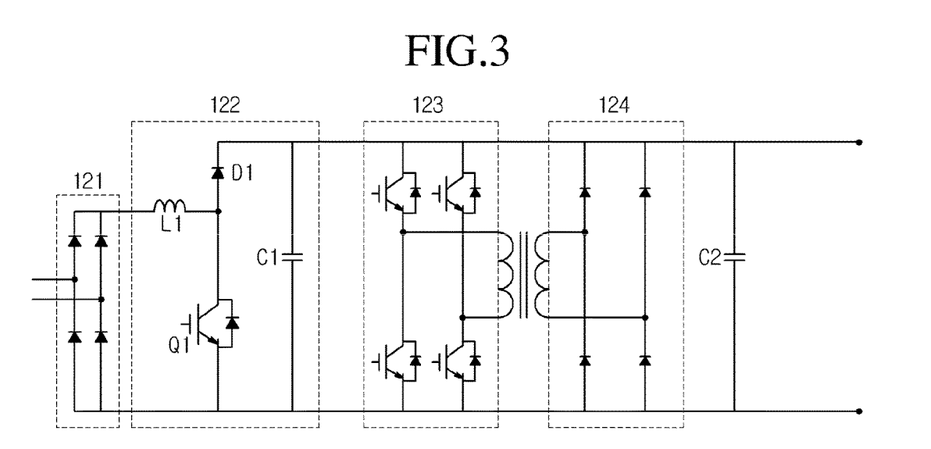
FIG. 3 is a circuit diagram showing the detailed structure of the first and second charging units of FIG. 2.

FIG. 3 is a circuit diagram showing the detailed structure of the first and second charging units shown in FIG. 2.

Referring to FIG. 3, each of the first and second charging units includes a DC-DC converting unit including an input rectifying unit 121, a voltage boosting conversion unit 122, an inverter unit 123, and an output rectifying unit 124.

The input rectifying unit 121 includes a full-bridge diode. The input rectifying unit 121 rectifies commercial AC power input through the charging plug 110 to DC power.

In particular, when a first switching device Q1 included in the voltage boosting conversion unit 122 is turned off, the input rectifying unit 121 allows current resulting from counter electromotive force of an inductor coil L1 to flow to the output side of the voltage boosting conversion unit 122, so that the power conversion efficiency is increased.

Since the voltage boosting conversion unit 122 may called a power factor correcting unit, the voltage boosting conversion unit 122 has a function of correcting (improving) the power factor by generating input current in phase with output voltage and input voltage in addition to a function of outputting boosted DC voltage.

The voltage boosting conversion unit 122 includes the first switching device Q1, an inductor coil L1, and an electrolytic condenser C1 to receive DC power rectified through the input rectifying unit 121, and boost the voltage of the input DC power.

The input current in phase with the output voltage and the input voltage of the voltage boosting conversion unit 122 may be generated under the control of the charging control unit 150 to control the switching operation of the first switching device Q1, that is, according to a PWM signal output through the charging control unit 150.

The electrolytic condenser C1 is a constant-voltage capacitor to output the DC output voltage of the voltage boosting conversion unit 122 while constantly maintaining the DC output voltage by the charging voltage thereof.

An anti-backflow diode D is connected to the first switching device Q1 of the voltage boosting conversion unit 122. The diode D is connected to the output terminal of the first switching device Q1 in order to allow only the flow of current toward the side of the electrolytic condenser C1 and prevent the current from inversely flowing.

The inverter unit 123 converts the DC voltage output from the voltage boosting conversion unit 122 into AC voltage, and has a plurality of second switching devices. The second switching device may include a semiconductor switch turned on or turned off under gate control. For example, the second switching device may include a silicon coupled rectifier (SCR), or an insulated gate bipolar transistor (IGBT). Body diodes connected to second switching devices constituting the inverter unit 123, respectively, in parallel, are anti-backflow diodes to prevent the current from inversely flowing toward the second switching devices from the output side of the inverter unit 123.

A transformer Tr is connected to the inverter unit 123 to send AC power to the output rectifying unit 124.

The output rectifying unit 124 is connected to an output terminal (secondary winding) of the transformer Tr to convert AC power received through the transformer Tr into DC power and supply the converted DC power to the battery 140.

Figure 4:
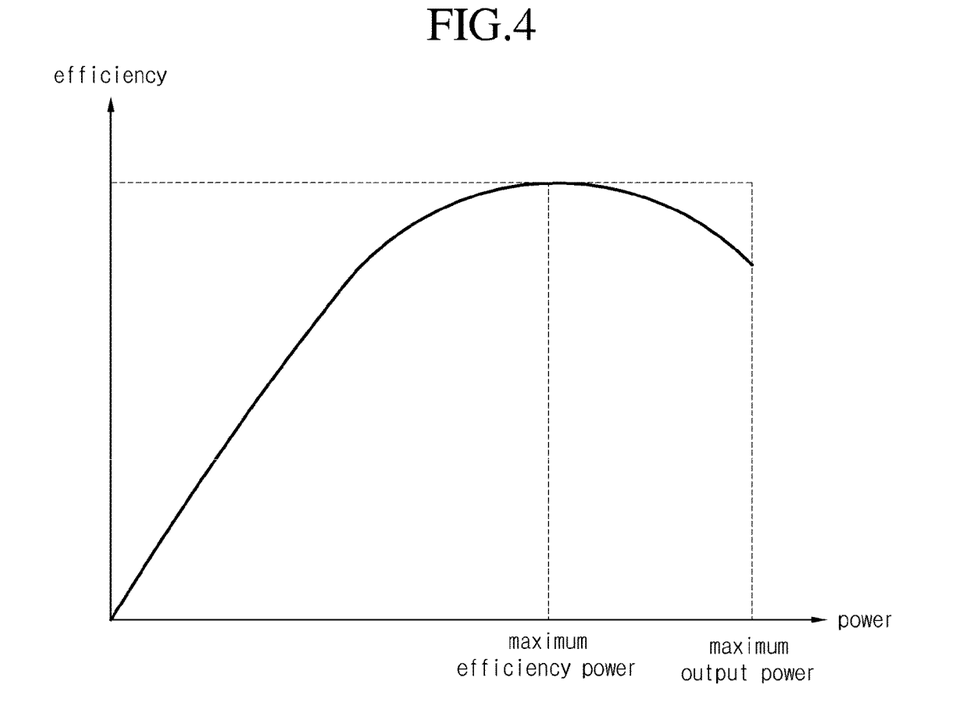
FIG. 4 is a graph to explain the specification of a charging unit according to the embodiment.

FIG. 4 is a graph to explain the specification of a charging unit according to the embodiment.

Charging units (first to Nth charging units) have characteristics varying depending on specifications thereof. The specification of the charging unit includes not only information of a model name of the charging unit and a manufacturer thereof, but also the maximum output power and the maximum efficiency power of the charging unit.

Generally, in the charging unit, the output power representing the maximum efficiency is not the maximum output power of the charging unit, but the power lower than the maximum output power. In other words, the maximum efficiency power of the charging unit is lower than the maximum output power.

Accordingly, the charging control unit 150 determines the combination of the output powers of the charging units corresponding to the charging power of the battery 140 based on the maximum output power and the maximum efficiency power of each charging unit.

Figure 5:
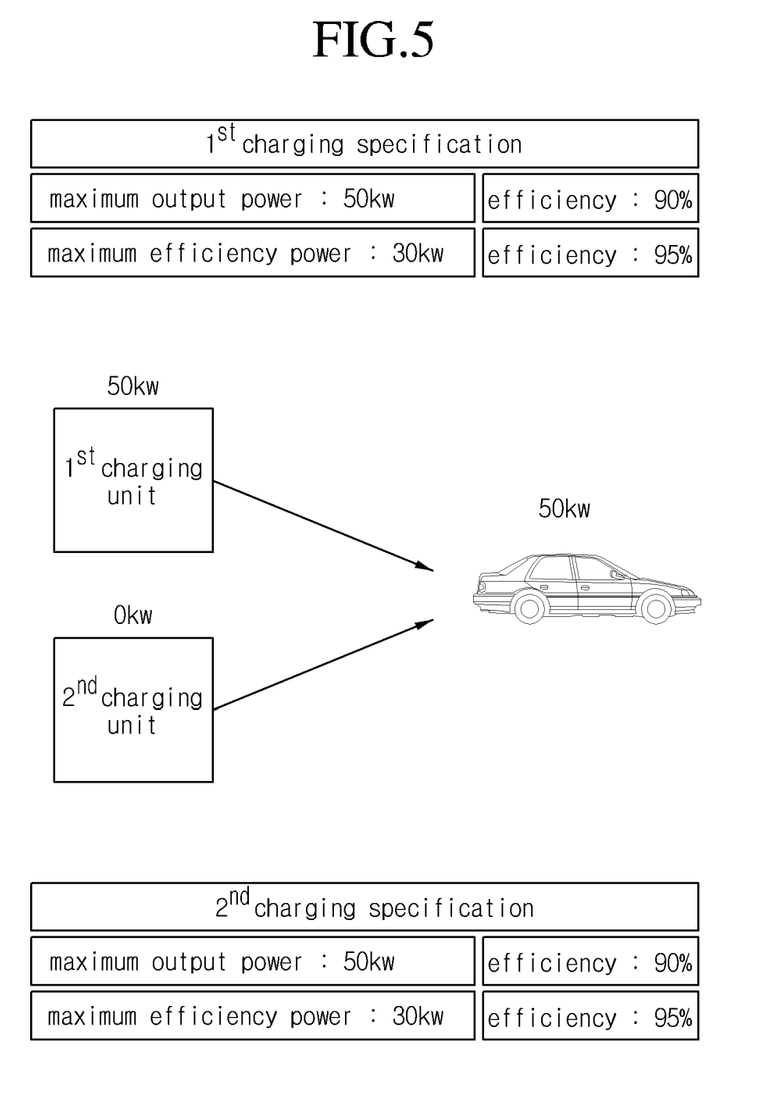
FIG. 5 is a view showing the case that a charging unit is exclusively actuated according to the embodiment.

FIG. 5 is a view showing the case that a charging unit is exclusively actuated according to the embodiment.

Referring to FIG. 5, the first and second charging units have the maximum output power of 50 kw and the maximum efficiency power of 30 kw.

If the charging power based on the specification of the battery 140 is 50 kw, a charging unit to be used for the charging and the output power of the charging unit may be set through the following scheme.

First, the charging control unit 150 determines the presence of a charging unit having the maximum output power higher than (equal to or higher than) the charging power.

In this case, since the maximum output power of the first and second charging units is equal to the charging power of the battery, the charging control unit 150 determines that the battery 140 can be charged by using only one charging unit.

In other words, the charging power of the battery is 50 kw, the maximum efficiency power of the first and second charging units is 50 kw, and the time spent on charging the battery by using only one of the charging units is equal to the time spent on charging the battery by using all charging units (because the output power from one charging unit is 50 kw, and the sum of output powers from the charging units is 50 kw)

Meanwhile, as described above, the higher power efficiency is represented when power is supplied to the battery by using one charging unit rather than the combination of the charging units.

Accordingly, the charging control unit 150 makes a decision that only one of the first and second charging units is exclusively actuated.

In this case, since the charging power is lower than the maximum output power of the charging unit, the charging control unit 150 sets the power, which is equal to the charging power in size, as the output power of the charging unit exclusively actuated.

In other words, as shown in FIG. 5, the charging control unit 150 exclusively actuates only the first charging unit so that the output power of the first charging unit is set to 50 kw equal to the charging power, and stops the operation of the second charging unit.

Figure 6:
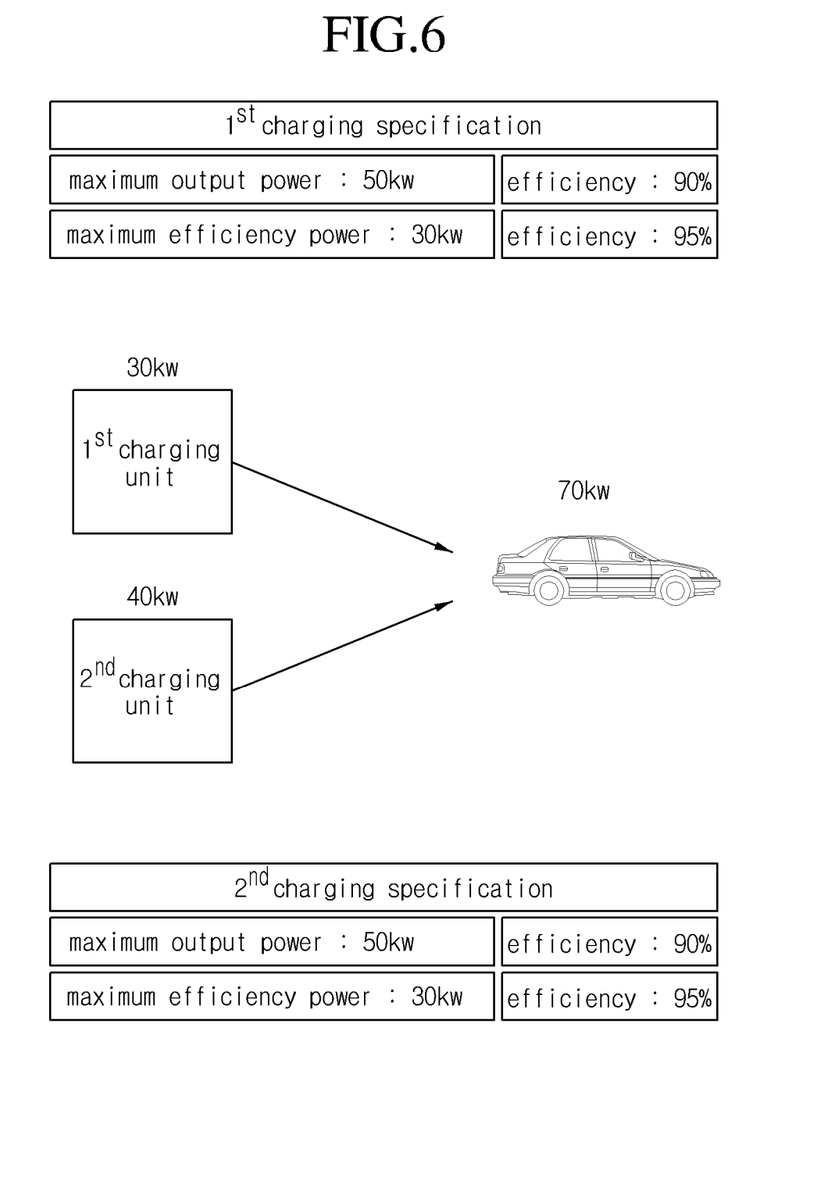
FIG. 6 is a view showing the case that a plurality of charging units are actuated in parallel according to the embodiment.

FIG. 6 is a view showing the case that a plurality of charging units are actuated in parallel according to the embodiment.

Referring to FIG. 6, the first and second charging units have the maximum output power of 50 kw and the maximum efficiency power of 30 kw.

If the charging power based on the specification of the battery 140 is 70 kw, a charging unit to be used for the charging and the output power of the charging unit may be set through the following scheme.

First, the charging control unit 150 determines the presence of a charging unit having the maximum output power higher than (equal to or higher than) the charging power.

In this case, since the maximum output powers of the first and second charging units are lower than the charging power of the battery, the charging control unit 150 actuates a plurality of charging units in parallel, so that the battery 140 is charged.

In other words, the charging control unit 150 may charge the battery 140 by using only one charging unit. However, in this case, as the power lower than the charging power is supplied to the battery, the charging time may be increased. Accordingly, the charging control unit 150 actuates the charging units in parallel to charge the battery 140.

In this case, the charging control unit 150 identifies the combination of output powers of the charging units representing the maximum power efficiency while corresponding to the charging power.

In other words, the combinations of the output powers corresponding to the charging power are as follows (the same cases are omitted).

(1) The output power of the first charging unit: 10 kw, and the output power of the second charging unit: 60 kw.

(2) The output power of the first charging unit: 20 kw, and the output power of the second charging unit: 50 kw.

(3) The output power of the first charging unit: 30 kw, and the output power of the second charging unit: 40 kw.

The charging control unit 150 checks the power efficiency (average power efficiency) for each combination described above, and identifies the combination representing the highest efficiency among the checked power efficiencies.

In addition, the charging control unit 150 sets output powers with respect to the charging units, respectively, based on the identified combination.

In other words, as shown in FIG. 6, the output power of the first charging unit may be set to 30 kw, and the output power of the second charging unit may be set to 40 kw.

As described above, according to the embodiment, a plurality of charging units are actuated in parallel, so that the battery of the electric vehicle is charged, thereby reducing the charging time of the battery.

In addition, according to the embodiment, the output powers of the charging units are set based on the combination of powers allowing the maximum efficiency of the charging units, thereby optimizing the efficiency, the price, and the volume of the charging units. In addition, the power loss can be minimized to prevent the heat emission and the delay in the charging of the battery.

Figure 7:
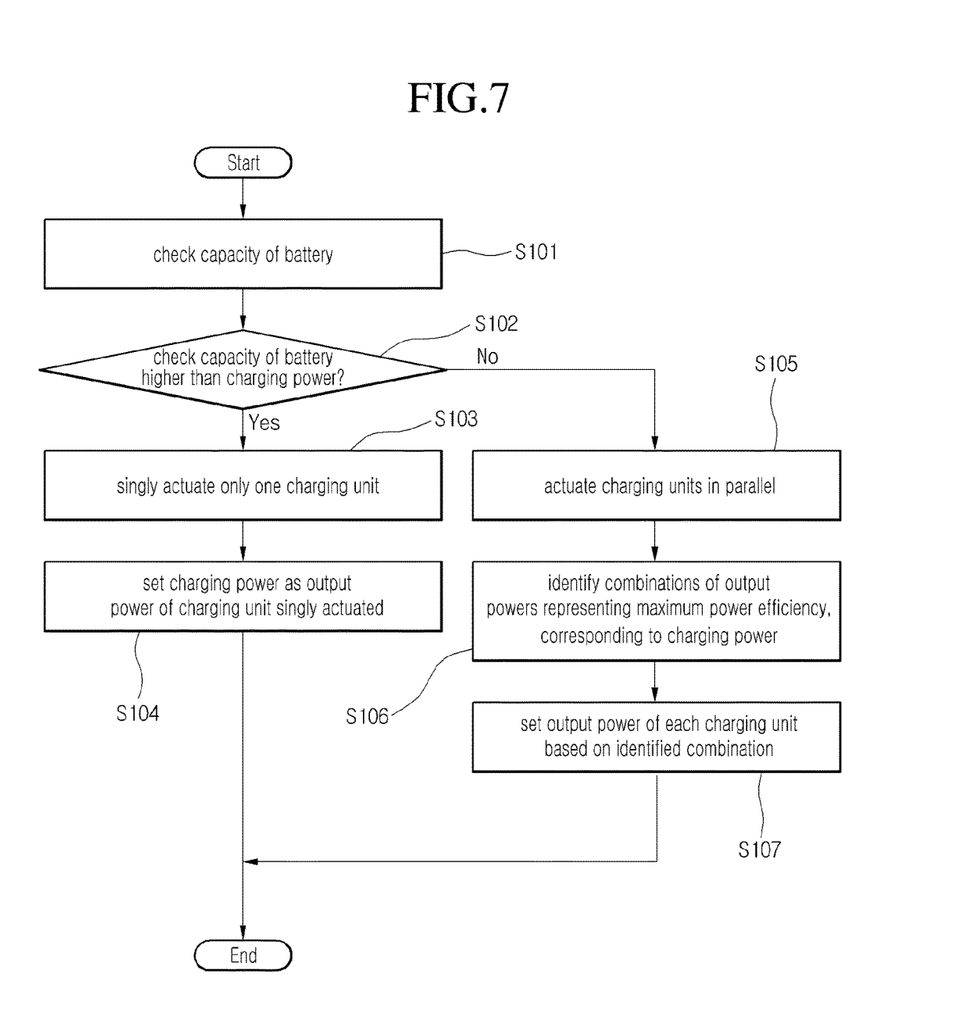
FIG. 7 is a flowchart showing a battery charging method in the battery charging apparatus according to the embodiment step by step.

FIG. 7 is a flowchart showing a battery charging method in the battery charging apparatus according to the embodiment step by step.

Referring to FIG. 7, the charging control unit 150 checks the capacity of the battery 140 (step S101). In other words, the charging control unit 150 checks the charging power to be supplied to the battery 140 according to the specifications of the battery 140.

Thereafter, the charging control unit 150 compares the maximum output power of each charging unit with the checked charging power to determine the presence of a charging unit representing the maximum output power higher than the charging power (step 102).

If the charging unit having the maximum output power higher than the charging power exists as the determination result (step 102), the charging control unit 150 exclusively actuates only one charging unit having the maximum power higher than the charging power to charge the battery 140 (step S103).

In this case, the charging control unit 150 sets the output power of the charging unit, which is exclusively actuated, to the power having the size equal to the size of the checked charging power (step S104).

Meanwhile, if the charging unit having the maximum output power higher than the charging power does not exist as the determination result (step S102), the charging control unit 150 actuates a plurality of charging units in parallel to charge the battery 140 (step S105).

In this case, the charging control unit 150 identifies the combination of output powers representing the highest power efficiency while corresponding to the charging power (step S106).

Thereafter, the charging control unit 150 sets the output power of each charging unit based on the identified combination (step S107).

According to the embodiment, the battery of an electric vehicle is charged by actuating the charging units in parallel, so that the charging time of the battery can be reduced.

In addition, according to the embodiment, the output powers of the charging units are set based on the charging power while enabling a plurality of charging units to represent the maximum efficiency, thereby optimizing the efficiency, the price, and the volume of the charging unit. In addition, the power loss can be minimized to prevent the heat emission and the delay in the battery charging.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claim is:

1. A battery charging apparatus comprising:
    a charging plug receiving an AC power supplied from an outside;
    a plurality of charging units individually converting the AC power received through the charging plug into a DC power;
    a battery storing the DC power output through at least one of the charging units and charged with the DC power; and
    a charging control unit comparing a specification of the battery with specifications of the charging units, determining at least one of the charging units to be used for charging of the battery, and controlling the charging of the battery by the at least one determined charging unit,
    wherein the specification of the battery comprises a charging power of the battery based on a capacity of the battery, and the specifications of the charging units comprise maximum output powers and maximum efficiency powers of the charging units,
    wherein the maximum output powers and the maximum efficiency powers of the charging units are different from each other,
    wherein the charging control unit performs the charging of the battery by exclusively actuating one charging unit having the maximum output power higher than the charging power of the battery if the charging unit having the maximum output power higher than the charging power of the battery is present,
    wherein the charging control unit determines a plurality of charging units to be used for the charging of the battery based on the maximum efficiency powers of the charging units and performs the charging of the battery by actuating the determined charging units in parallel if the charging unit having the maximum output power higher than the charging power of the battery is absent, and
    wherein the charging control unit determines combinations of output powers of the charging units equal to the charging power, checks average power efficiency when the output powers of the charging units are set through the combinations, sets the output powers of the charging units based on a combination representing a higher average power efficiency.

2. The battery charging apparatus of claim 1, wherein the charging control unit sets a power having a size equal to a size of the charging power of the battery as an output power of the charging unit that is exclusively actuated.

3. The battery charging apparatus of claim 1, wherein the charging control unit identifies a combination representing a maximum power efficiency among combinations of possible output powers, which are generated from the charging units, based on the charging power of the battery and individually sets output powers of the charging units actuated in parallel based on the identified combination.

4. The battery charging apparatus of claim 3, wherein the charging control unit stores combination information representing the maximum power efficiency based on a number of cases of the possible output powers for the charging power of the battery, and the combination information comprises information of the output powers that are set for the charging units, respectively.

5. A battery charging method comprising:
    detecting a charging power of a battery based on a capacity of the battery;
    comparing the charging power with specifications of a plurality of charging units, wherein the specifications of the charging units comprise maximum output powers and maximum efficiency powers of the charging units;
    determining presence of a charging unit having a maximum output power higher than the detected charging power;
    charging the battery by exclusively actuating one charging unit having the maximum output power higher than the charging power if the charging unit is present;
    determining a plurality of charging units to be used for the charging of the battery based on the maximum efficiency powers of the charging units if the charging unit having the maximum output power higher than the charging power of the battery is absent; and
    charging the battery by actuating the determined charging units in parallel,
    wherein the determining the plurality of charging units comprises
    determining combinations of output powers of the charging units equal to the charging power,
    checking average power efficiency when the output powers of the charging units are set through the combinations, and
    setting the output powers of the charging units based on a combination representing a higher average power efficiency.

6. The battery charging method of claim 5, wherein the charging of the battery by exclusively actuating the one charging unit comprises:
    setting a power equal to the charging power of the battery as an output power of the charging unit that is exclusively actuated;
    generating the output power by the charging unit that is exclusively actuated; and
    charging the battery by supplying the generated output power to the battery.

7. The battery charging method of claim 5, wherein the charging of the battery by actuating the determined charging units in parallel comprises
    generating the set output powers by the charging units, respectively; and
    charging the battery by supplying the generated output powers to the battery.

8. The battery charging method of claim 7, wherein the checking of the combinations of the possible output powers generated from the charging units based on the charging power of the battery comprises checking a number of cases that a sum of the possible output powers generated from the charging units is equal to the charging power of the battery.

9. The battery charging method of claim 7, further comprising storing combination information representing the maximum power efficiency according to the number of the cases for the charging power of the battery generated based on the capacity of the battery,
    wherein the identifying of the combination representing the maximum power efficiency comprises identifying the combination representing the maximum power efficiency by using the stored combination information.

\* \* \* \* \*